US010027723B2

(12) United States Patent
Keskitalo et al.

(10) Patent No.: US 10,027,723 B2
(45) Date of Patent: Jul. 17, 2018

(54) METHOD AND APPARATUS FOR INITIATING COMMUNICATION AND SHARING OF CONTENT AMONG A PLURALITY OF DEVICES

(71) Applicant: Provenance Asset Group LLC, Essex, CT (US)

(72) Inventors: Tuomas Velsi Keskitalo, Oulunsalo (FI); Ari Antero Aarnio, Espoo (FI)

(73) Assignee: Provenance Asset Group LLC, Essex, CT (US)

(*) Notice: Subject to any disclaimer, the term of this patent is extended or adjusted under 35 U.S.C. 154(b) by 272 days.

(21) Appl. No.: 13/862,037

(22) Filed: Apr. 12, 2013

(65) Prior Publication Data

US 2014/0310348 A1    Oct. 16, 2014

(51) Int. Cl.
*H04L 29/06* (2006.01)

(52) U.S. Cl.
CPC ...... *H04L 65/1089* (2013.01); *H04L 65/4046* (2013.01); *H04L 65/4084* (2013.01)

(58) Field of Classification Search
CPC ... H04L 29/06; H04L 65/403; H04L 65/1089; H04L 65/4046; H04L 65/4084
USPC .......................... 709/204; 455/41.2
See application file for complete search history.

(56) References Cited

U.S. PATENT DOCUMENTS 7,849,135 B2 * 12/2010 Agrawal et al. ............... 709/204
8,353,052 B2 *  1/2013 Larsson et al. ................ 726/29
2009/0111378 A1 *  4/2009 Sheynman et al. .......... 455/41.1
2009/0171905 A1 *  7/2009 Garcia ............... G06F 17/30728
2011/0023096 A1 *  1/2011 Xiao et al. ........................ 726/5
2011/0106954 A1 *  5/2011 Chatterjee et al. ........... 709/227
2013/0225080 A1 *  8/2013 Doss et al. ................... 455/41.2

OTHER PUBLICATIONS

Kozierok, The TCP/IP Guide, Sep. 20, 2005, www.tcpipguide.com, v3.0 (2 pages).*
Menon, "How to configure Document expiration policy", Jan. 10, 2010, blog.technet.microsoft.com (5 pages).*

* cited by examiner

*Primary Examiner* — Wing F Chan
*Assistant Examiner* — Leon Y Tseng
(74) *Attorney, Agent, or Firm* — Dinsmore & Shohl LLP

(57) ABSTRACT

An approach for communication and sharing of content among user devices includes a method for determining a request for sharing of at least one content item between at least one device and one or more other devices, wherein the request is determined by at least one content sharing component. The method also comprises causing an initiation of at least one communication component to cause an establishment of a communication session between the at least one device and the one or more other devices. The method further comprises causing a transfer of one or more tokens to the at least one device for facilitating the sharing of the at least one content item, wherein the transfer of the one or more tokens is over the communication session, and wherein the sharing is performed over at least one other communication session.

18 Claims, 14 Drawing Sheets

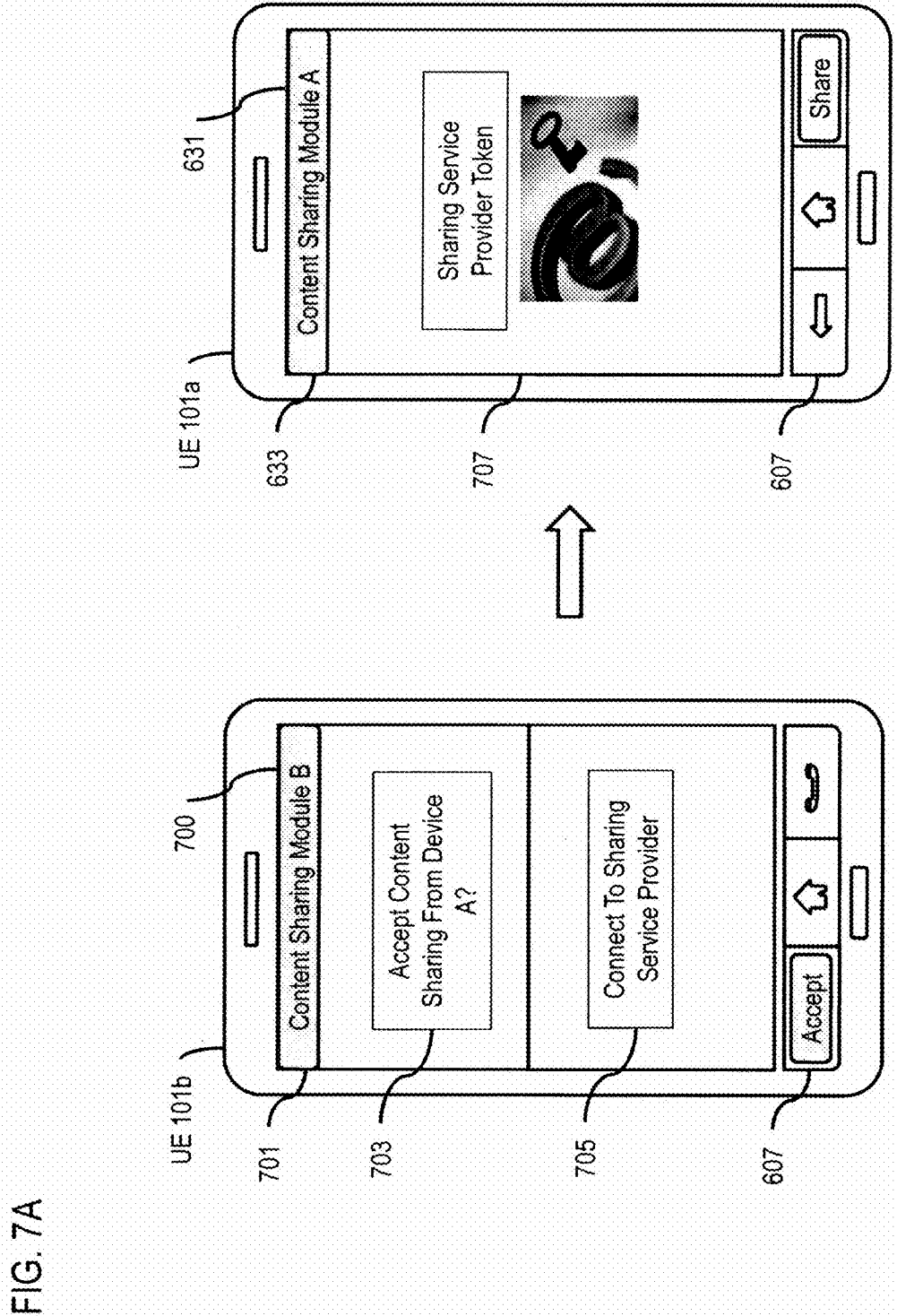

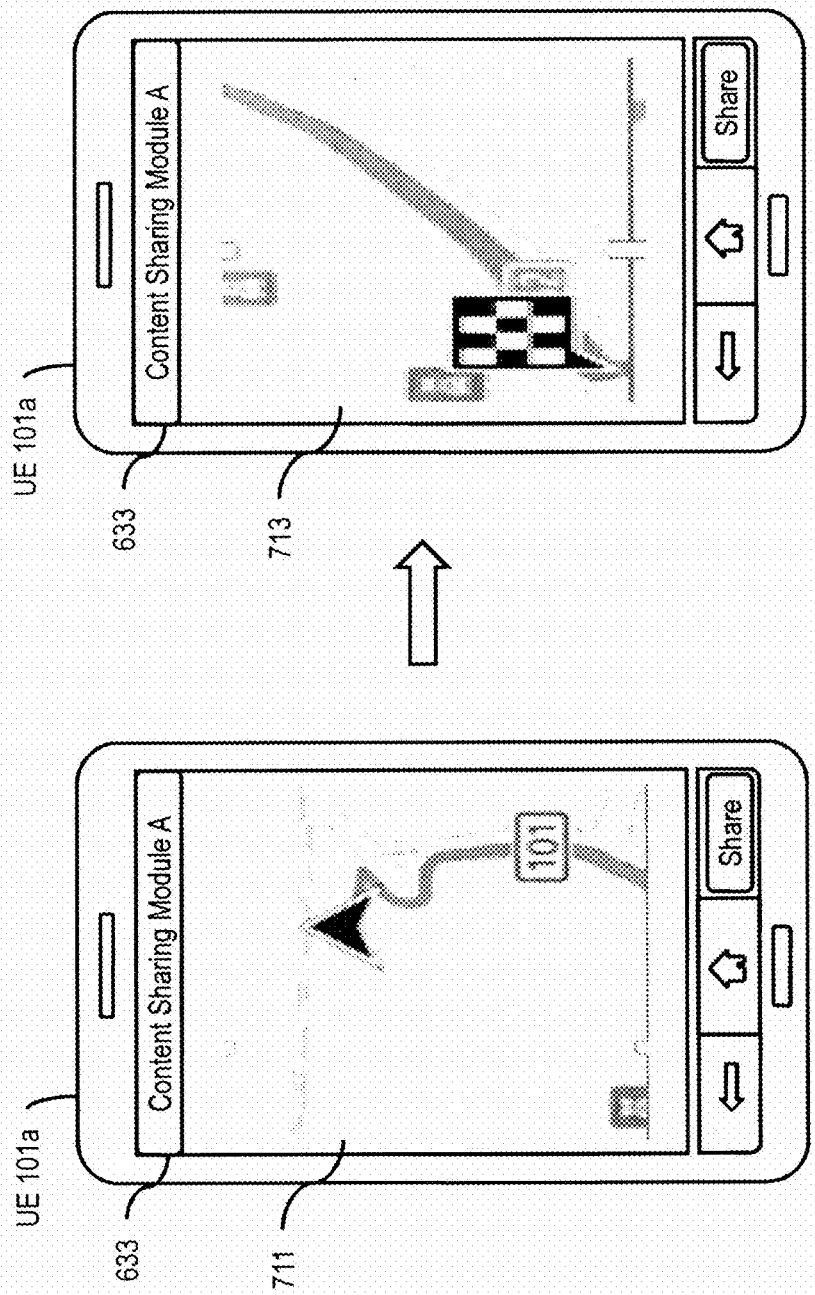

METHOD AND APPARATUS FOR INITIATING COMMUNICATION AND SHARING OF CONTENT AMONG A PLURALITY OF DEVICES

BACKGROUND

Service providers (e.g., wireless, cellular, etc.) and device manufacturers are continually challenged to deliver value and convenience to consumers by, for example, providing compelling network services. One area of interest is providing the capability for users to share various content items with other users by utilizing various devices, methods, and available services. In various situations, a user may wish to share a content item (e.g., a picture) with other users via one or more local proximity-based communication mechanisms; however, such sharing may be time consuming and difficult where the users may have to establish multiple communication channels/sessions among the user devices via proximity-based communication methods. Alternatively, users may share their content items via available networks and service providers; however, this approach may require a user to upload the content for sharing to a service provider network access point (e.g., a website, a social network site), provide the access point information to other users, where the other users would have to login to the access point for accessing the content. Therefore, service providers and device manufacturers face significant challenges in providing more efficient and user friendly mechanisms for sharing content.

SOME EXAMPLE EMBODIMENTS

Therefore, there is a need for communication and sharing of content among user devices.

According to one embodiment, a method comprises determining a request for a sharing of at least one content item between at least one device and one or more other devices, wherein the request is determined by at least one content sharing component. The method also comprises causing, at least in part, an initiation of at least one communication component to cause, at least in part, an establishment of a communication session between the at least one device and the one or more other devices. The method further comprises causing, at least in part, a transfer of one or more tokens to the at least one device for facilitating the sharing of the at least one content item, wherein the transfer of the one or more tokens is over the communication session, and wherein the sharing is performed over at least one other communication session.

According to another embodiment, an apparatus comprises at least one processor, and at least one memory including computer program code, the at least one memory and the computer program code configured to, with the at least one processor, cause, at least in part, the apparatus to determine a request for a sharing of at least one content item between at least one device and one or more other devices, wherein the request is determined by at least one content sharing component. The apparatus is also caused to cause, at least in part, an initiation of at least one communication component to cause, at least in part, an establishment of a communication session between the at least one device and the one or more other devices. The apparatus is also caused to cause, at least in part, a transfer of one or more tokens to the at least one device for facilitating the sharing of the at least one content item, wherein the transfer of the one or more tokens is over the communication session, and wherein the sharing is performed over at least one other communication session.

According to another embodiment, a computer-readable storage medium carries one or more sequences of one or more instructions which, when executed by one or more processors, cause, at least in part, an apparatus to determine a request for a sharing of at least one content item between at least one device and one or more other devices, wherein the request is determined by at least one content sharing component. The apparatus is also caused to cause, at least in part, an initiation of at least one communication component to cause, at least in part, an establishment of a communication session between the at least one device and the one or more other devices. The apparatus is also caused to cause, at least in part, a transfer of one or more tokens to the at least one device for facilitating the sharing of the at least one content item, wherein the transfer of the one or more tokens is over the communication session, and wherein the sharing is performed over at least one other communication session.

According to another embodiment, an apparatus comprises means for determining a request for a sharing of at least one content item between at least one device and one or more other devices, wherein the request is determined by at least one content sharing component. The apparatus also comprises means for comprises causing, at least in part, an initiation of at least one communication component to cause, at least in part, an establishment of a communication session between the at least one device and the one or more other devices. The apparatus further comprises means for causing, at least in part, a transfer of one or more tokens to the at least one device for facilitating the sharing of the at least one content item, wherein the transfer of the one or more tokens is over the communication session, and wherein the sharing is performed over at least one other communication session.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the following.

An embodiment ("first embodiment") that relates to a method for improving privacy of subscribers of a service provider IP network, where the service provider has a worldwide unique collection of global IP addresses to be used by its subscribers, being said worldwide unique collection of global IP addresses divided in K predefined sub-collections of global IP addresses, being K a design parameter and where the region served by the service provider is divided in different zones, the service provider having for each zone a network node, called IP address assigner node, which assigns unique global IP addresses to the subscribers located in said zone, the method comprising the following steps: a) Every certain time period, every IP address assigner node applies a certain algorithm to select, the sub-collection of global IP addresses to use from the predefined K sub-collections of the service provider, said algorithm having at least one parameter, the value of which determines the result of the algorithm, the value of said at least one parameter being calculated every said time period by each IP address assigner node; where said algorithm is a pseudo-random algorithm and the at least one parameter is the seed of the pseudo random algorithm; where for the selection of the sub-collection, all the IP address assigner nodes use the same algorithm but with different value of the at least one parameter and where the selection fulfills the following conditions: the sub-collections selected by an IP address assigner node changes every said certain time period and the sub-collections selected by different IP address assigner nodes are not overlapped, i.e. there is no global IP address in common between sub-collections selected by different IP address assigner nodes; and b) each IP address assigner node assigns, to the subscribers located in their correspondent zones, global IP addresses from the sub-collection of global IP addresses selected in the previous step.

A method according to the first embodiment, where each IP address assigner node has an unique identification, ID, different from the identification of the rest of IP address assigner nodes and where each IP address assigner node calculates the at least one parameter value as a function of said unique ID and the number of time periods elapsed from a certain defined time start.

A method according to the first embodiment, where the global IP addresses are global IPv6 addresses and the IP assigner nodes are Broadband Remote Access Servers.

A method according to the first embodiment, where the global IP addresses are global IPv4 and the IP assigner nodes are Carrier Grade Network Address Translation Nodes.

A method according to the first embodiment, where the step a) of applying a certain algorithm to select the sub-collection of global IP addresses to use during a certain time period further comprises: every time period, each IP address assigner calculates the value of the at least one parameter as a function of an unique identification of the IP address assigner and the number of time periods elapsed from a certain defined time start; and every time period, each IP address assigner applies the certain algorithm with the at least one parameter calculated to give as result the number of sub-collection to use from the group of predefined sub-collections.

A method according to the preceding embodiment, where the sub-collection selected in a certain time period by an IP address assigner node of the service provider network cannot be selected by any other of the IP address assigner nodes of the service provider network in the following time period, so the same sub-collection cannot be selected in two consecutive time periods.

A method according to the first embodiment, where the sub-collections are formed by a single pool of consecutive global IP addresses or by several non-consecutive pools of consecutive global IP addresses.

An additional embodiment ("second embodiment") that relates to a network node in a service provider network for improving privacy of subscribers of the service provider IP network, where the service provider has a worldwide unique collection of global IP addresses to be used by its subscribers, being said worldwide unique collection of global IP addresses divided in K predefined sub-collections of global IP addresses, being K a design parameter and where the region served by the service provider is divided in different zones and where said network node, called IP address assigner node, is associated to one of these zones and it assigns unique global IP addresses to the subscribers located in said zone, where said network nodes comprises: a processor for, every certain time period, applying an algorithm to select the sub-collection of global IP addresses to use from the predefined K sub-collections of the service provider, said algorithm having at least one parameter, the value of which determines the result of the algorithm, where said algorithm is a pseudo-random algorithm and the at least one parameter is the seed of the pseudo random algorithm, where for the selection of the sub-collection, all the IP address assigner nodes of the service provider networks use the same algorithm but with different value of the at least one parameter and where the algorithm fulfills the following conditions: the sub-collections selected by the IP address assigner node changes every said certain time period and the sub-collections selected by different IP address assigner nodes are not overlapped, i.e. there is no global IP address in common between sub-collections selected by different IP address assigner nodes; a processor for calculating the value of said at least one parameter every said time period by each IP address assigner node; and a processor for assigning to the subscribers located in its associated zone, global IP addresses from the sub-collection of global IP addresses previously selected.

A network node according to the second embodiment, where the global IP addresses are global IPv6 addresses and the network node is a Broadband Remote Access Server.

A network node according to the second embodiment, where the global IP addresses are global IPv4 addresses and the network node is a Carrier Grade Network Address Translation Node.

A network node according to the second embodiment, where the network node has an unique identification, ID, different from the identification of the rest of IP address assigner nodes and where the network node calculates every period of time the at least one parameter value as a function of said unique ID and the number of time periods elapsed from a certain defined time start.

An additional embodiment ("third embodiment") relates to a non-transitory computer-readable storage device storing computer-executable instructions which, when executed by a processor of a computing device, cause the processor perform operations comprising the steps of: a) Every certain time period, every IP address assigner node applies a certain algorithm to select, the sub-collection of global IP addresses to use from the predefined K sub-collections of the service provider, said algorithm having at least one parameter, the value of which determines the result of the algorithm, the value of said at least one parameter being calculated every said time period by each IP address assigner node, where said algorithm is a pseudo-random algorithm and the at least one parameter is the seed of the pseudo random algorithm, where for the selection of the sub-collection, all the IP address assigner nodes use the same algorithm but with different value of the at least one parameter and where the selection fulfills the following conditions: the sub-collections selected by an IP address assigner node changes every said certain time period and the sub-collections selected by different IP address assigner nodes are not overlapped, i.e. there is no global IP address in common between sub-collections selected by different IP address assigner nodes; and b) each IP address assigner node assigns, to the subscribers located in their correspondent zones, global IP addresses from the sub-collection of global IP addresses selected in the previous step.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6 and 7A through 7D show example UI illustrations utilized for communication and sharing of content among user devices, according to various embodiments;

DESCRIPTION OF SOME EMBODIMENTS

Examples of a method, apparatus, and computer program for a more efficient and user friendly mechanism for communication and sharing of content among user devices. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
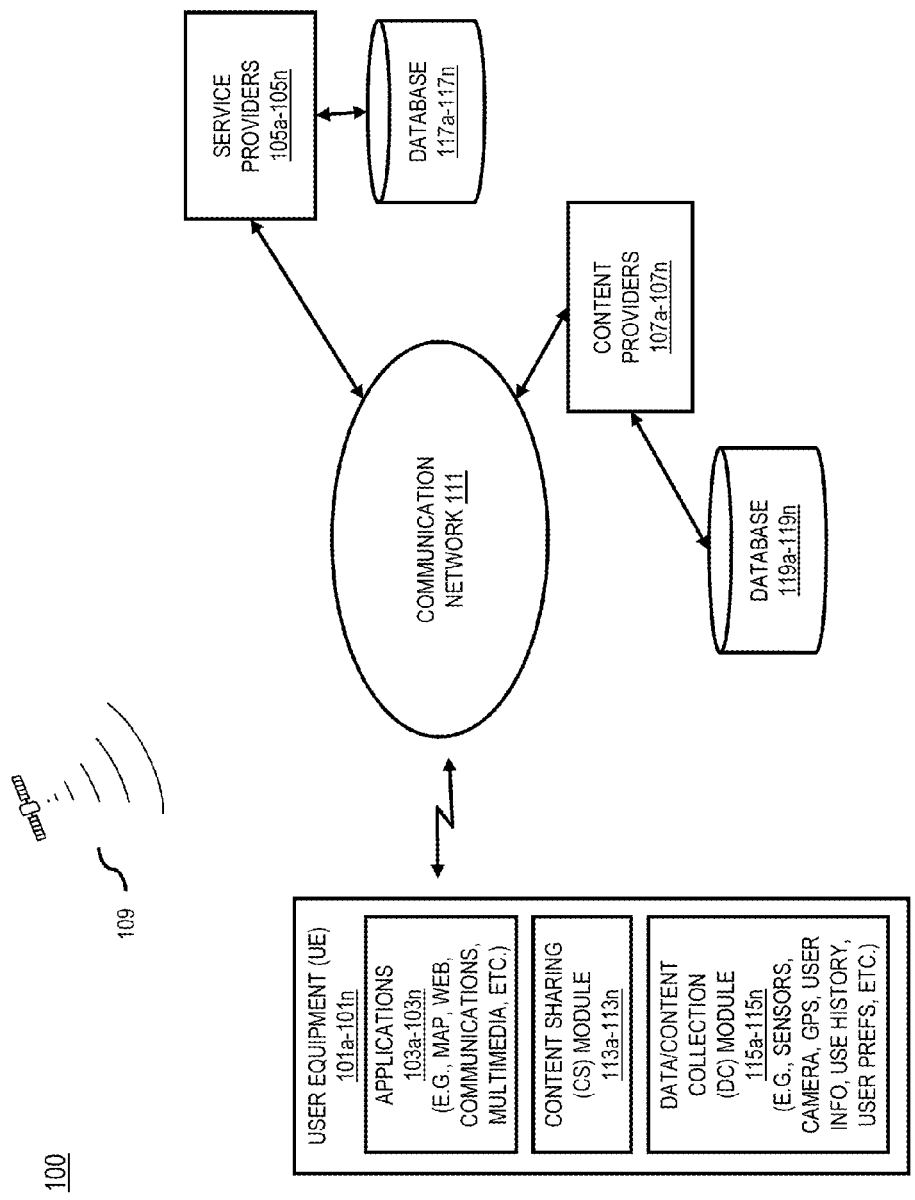
FIG. 1 is a diagram of a system capable of providing for communication and sharing of content among user devices, according to one embodiment.

FIG. 1 is a diagram of a system capable of providing for a more efficient and user friendly mechanism for communication and sharing of content among user devices, according to an embodiment. Generally, users may share content items via various mechanisms available on their user devices, for example, via proximity-based communication links (e.g., Bluetooth®, near field communications (NFC), etc.), via a network channel (e.g., a server, a service provider, a website, etc.), and the like. In some scenarios where the users wish to share various content items, for example from one device to another, an available proximity-based sharing mechanism may not be efficient (e.g., slow, power intensive, etc.) for transferring/sharing the content items (e.g., large files) among the user devices. In one example, to utilize a proximity-based channel, a first user may request to establish a communication channel with a second device, wherein the second user would accept the request and the two users would complete a process to link/couple the two devices. Alternatively, a user may utilize a network channel via a service provider (e.g., Internet website, etc.) to upload the content items for sharing and then provide the network channel information to other users so that they may access the network channel and the content items. However, sharing the content items via the traditional mechanisms may require a website address, login identification (ID), a password, and the like in order to upload and download the content items. Further, if the content items are to be shared with a plurality of users, where each individual user may need to access an individual channel/access point, the process may be overwhelming and redundant for a user intending to share his content items with the plurality of users. Therefore, service providers face significant challenges in providing a more efficient and user friendly mechanism for communication and sharing of content among user devices.

To address, at least these problems, a system 100 of FIG. 1 introduces the capability of a more efficient and user friendly mechanism for communication and sharing of content among user devices. More specifically, users in different settings may wish to utilize a user device (e.g., a tablet, a mobile phone, etc.) and a simple process to quickly establish a communication channel with one or more other devices for sharing various content items, for example, pictures, videos, audio, navigation routes/maps, documents, game applications, and the like, where the process may include as few simple steps as possible without necessarily having to perform all the traditional steps. In one scenario, a first user at an event (e.g., a wedding party) may use a device (e.g., a mobile phone, a camera, etc.) to capture pictures/videos of the event, and a second user may wish to view and/or receive one or more of the pictures/videos available on the first user's device. In one embodiment, the first user may select a content sharing application to share/transfer content items (e.g., a picture, a video, etc.) with/to the second user, which may cause a communication application to initiate an establishing of a proximity-based communication channel (e.g., Bluetooth®) between the first user device and the second user device. In one embodiment, the second user device may utilize a content sharing application to initiate an establishing of a network communication session (e.g., a website, a server, via the Internet, WLAN, etc.) with a service provider site whereby the contents from the first device may be shared, viewed, transferred, and the like. In one embodiment, a token associated with the service provider site for sharing the content item may be transferred to the first device, for example, via the second device, via a service provider, and the like. Generally, a token may include a unique identifier associated with the service provider site and a current interaction session with a user/device, information related to the user/device, access privileges for other users, authentication credentials, security information, etc., which may be used by one or more user devices to access a service provider site.

In one embodiment, the first device may utilize the token to upload; for example, via a network communication channel, the content item so the second user may view, transfer, etc. the content item. In one embodiment, the content item may be available for sharing, viewing, presentation, etc. only while the first device maintains a connection to the service provider site whereby the content item is being shared. In one embodiment, the content item may be available at the service provider site for sharing/transfer for a predetermined duration of time. For example, a first device may share a navigation route, via a service provider site, with one or more other devices where the navigation route may be shared for a duration of time even after the first device disconnects communication with the service provider site. In one embodiment, a proximity-based communication application on a first device may initiate discovery of one or more other near-by devices and cause an execution of one or more content sharing applications at the first device and/or at the one or more other near-by devices.

In various embodiments, a source device may substantially simultaneously communicate and share one or more content items with one or more other devices. In one embodiment, a source device may utilize a communication application for establishing one or more proximity-based communication sessions with one or more other devices without a need for passwords, logins, passcodes, pairing information, and the like. In one embodiment, a source device may determine capability information (e.g., display type, display size, processing power, power level, loud speakers, etc.) associated with one or more target devices for presenting/sharing one or more content items, wherein the content items may be presented/shared at the target device with better capabilities.

In one use case scenario, a device "A" may discover another device (e.g., device "B"), for example, via a Bluetooth® Low Energy (BLE) or a Bluetooth® communication channel, where the CS module at the device "A" may determine an UI element (e.g., an icon) indicative that the device "A" may be able to connect with the device "B" for sharing one or more contents. In one embodiment, the device "B" may determine a similar UI element at the device "B." In various scenarios, a user at the devices "A" and/or "B" may tap/click on the respective UI elements (e.g., the icon) for initiating a sharing of one or more content items with the other device. In various scenarios, the devices "A" and "B" may exchange or cause an exchange of a token associated with a sharing session between the devices. In one example, a user "A" may select and click/tap on one or more contents (e.g., an image) at a local/remote storage (e.g., gallery, library, cloud storage, etc.) for sharing and presentation at the device "B." In various embodiments, a token may be valid for a certain duration of time, only for a certain sharing session, may include a "best before" time stamp, or the like.

In various embodiments, one or more users may utilize capabilities and benefits of the system 100 to easily share various content items with one or more other users, wherein the process is simple, efficient, user-friendly, and conducive to sharing content items by utilizing one or more components of a content sharing module to initiate and complete the communication and sharing processes.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, communications, content sharing, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), and/or with other components of the system 100 directly and/or via communication network 111. In one embodiment, the UEs 101 may include content sharing modules 113a-113n (also collectively referred to as the CS module 113.) In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the CS module 113 may include various predefined parameters and configuration information associated with a user, a user device, one or more service providers, one or more content providers, and the like. In one embodiment, the CS module 113 may present one or more options for a user to select one or more content items from a list of content items available for sharing. For example, a first user may utilize a CS module 113a on a UE 101a (source) to select a content item, via a UI feature (e.g., to highlight), for sharing with one or more other devices (targets.) Further, the CS module 113a may cause a communication component/module to transmit a request to one or more target devices; for example, via a proximity-based communication channel, for sharing the one or more selected content items with the target devices. In one embodiment, a CS module 113b on a target device may determine that a source device is requesting to share a content item with the target device, wherein the CS module 113b may access a service provider site (e.g., a sharing platform) for determining one or more tokens for use in sharing of the content items between the source device and the target device. In one embodiment, the service provider may directly provide the one or more tokens to the source device. In one embodiment, the target device may acquire and provide the one or more tokens to the source device.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like. In one embodiment, a service provider 105 may receive and process a request/input from a user for establishing a content channel wherein one or more users may share content items among the users. In one embodiment, the service provider 105 may utilize various algorithms, software applications, modules, hardware, firmware, and the like for processing, recognizing, detecting, comparing, and the like content items (e.g., media items) that may be associated with a content channel and use a processed content item for authenticating one or more users wishing to access the content channel if the users submit substantially same content item as a key for accessing the content channel. In one embodiment, a service provider 105 may facilitate a sharing of contents among a plurality of devices. By way of example, a service provider may provide one or more content sharing network channels and resources (e.g., servers, websites, etc.) whereby a plurality of users may share one or more content items with one or more other users. In one embodiment, a user may utilize an application and/or a module to establish a network communication channel at a service provider for sharing contents among a plurality of users, wherein the service provider may provide one or more tokens associated with the one or more network communication channels and resources. Further, a source device (e.g., a first mobile device) may utilize the one or more tokens for accessing the network communication channels and resources for sharing the content items with one or more target devices (e.g., a second mobile device.) By way of example, a token may include a unique identifier associated with the service provider site and a current interaction session with a user, information related to the user, access privileges for other users, authentication credentials, security information, etc., which may be used by one or more devices to access a service provider site.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In one embodiment, the system 100 determines a request for a sharing of at least one content item between at least one device and one or more other devices, wherein the request is determined by at least one content sharing component. In one embodiment, a user of a first (source) device may select one or more content items for sharing with another (target) device, where the selection and sharing may be effectuated via a content sharing component, module, and/or application. In various embodiments, the source device and the target device may utilize the same or different content sharing components, modules, and/or applications. For example, the source device may utilize a certain content sharing component (e.g., a PhotoBeamer) where the target device may utilize a generic application for consuming a content item, for example, for viewing a digital image on the target device.

In one embodiment, the system 100 causes, at least in part, an initiation of at least one communication component to cause, at least in part, an establishment of a communication session between the at least one device and the one or more other devices. In one embodiment, the at least one communication session is initiated, at least in part, by the at least one content sharing component at the at least one device, at the one or more other devices, or a combination thereof. In one embodiment, once a content sharing component at a source device detects that a user has selected a content item for sharing, the content sharing component may cause a communication component to establish a communication session with one or more target devices. For example, the content sharing component may cause the content sharing module 113 to cause a communication component to utilize a proximity-based communication protocol to scan for and discover any nearby target devices. In one embodiment, a source device may already have established communication sessions with one or more other devices before a user initiates a content sharing task on the source device. In one embodiment, the communication session between the at least one device and the one or more other devices is based, at least in part, on at least one request from the at least one device using a non-pairing communication protocol. In one embodiment, the source device may establish a proximity-based communication session with a target device via a non-pairing communication protocol, where the target device may not be required to perform a device-pairing process (e.g., passwords, passcodes, etc.) For example, the source device may utilize a communication component to request a communication session with a target device, wherein a communication component on the target device may establish the communication session without a need for a user on the target device to perform any process steps in accepting or completing the process. In one instance, the source device and the target device may utilize a prior communication session information. In one embodiment, the request for a sharing of the at least one content item is initiated, at least in part, by the at least one communication component at the at least one device, at the one or more other devices, or a combination thereof.

In one embodiment, the system 100 causes, at least in part, a transfer of one or more tokens to the at least one device for facilitating the sharing of the at least one content item, wherein the transfer of the one or more tokens is over the communication session, and wherein the sharing is performed over at least one other communication session. In one embodiment, once a target device receives a request for sharing a content item from another device (e.g., a source device), the target device may establish another communication session (e.g., via a local area network (LAN), a wireless LAN (WLAN), a cellular network channel, etc.) with a service provider via which the content item may be shared, viewed, presented, retrieved, and the like. Further, the service provider may generate/determine one or more tokens associated with a content sharing session/channel/site. In one embodiment, a target device may present the one or more tokens to a source device via the proximity-based communication session. In one embodiment, a service provider may present the one or more tokens to one or more source and/or target devices via one or more communication sessions (e.g., cellular network channel.) Generally, a token may include a unique identifier associated with a service provider site and a current interaction session with a user/device, information related to the user/device, access privileges for other users/devices, authentication credentials, security information, etc., which may be used by one or more user devices to access a service provider site.

In one embodiment, the system 100 causes, at least in part, an initiation of the sharing of the at least one content item based, at least in part, on the one or more tokens. In one embodiment, a source device may initiate a sharing of a content item with a target device once the source device receives one or more tokens. In one embodiment, the sharing of the at least one content item with a first one of the one or more devices is performed substantially simultaneously with the sharing of the at least one content item with a second one of the one or more devices. For example, a source device may receive one or more tokens associated with one or more target devices and/or one or more service provider content sharing channels for sharing one or more content items with the one or more target devices. In one embodiment, the each of the one or more tokens is unique to each of the one or more other devices, is shared among the one or more other devices, or a combination thereof. For example, a service provider may present a token associated with a sharing channel/session to a plurality of target devices where, for example, several target devices may access a same content item presented by a source device. In one embodiment, a target device may present/share a token to/with one or more other target devices.

In one embodiment, the system 100 determines a capability information of the one or more other devices for displaying the at least one content item. In one embodiment, a source device may inquire information on one or more device capability information associated with one or more target devices, via which one or more content items may be shared. For example, the capability information may include information on a display type, memory size, processing power, battery power, user interface features, loud speakers type, and the like. In various embodiments, a target device may present its device capability information directly to a source device, to a service provider, and the like. In one embodiment, the service provider may present a target device capability information to a source device, for example, via a token.

In one embodiment, the system 100 causes, at least in part, the sharing of the at least one content item via at least one of the one or more other devices based, at least in part, on the capability information. In various embodiments, a source device and/or a service provider may determine to present/share a content item via a target device based on one or more capabilities available at the target device. For example, if there are several target devices which may wish to receive and share a video content item from a source device, the target device with better display and loud speakers may be utilized for sharing the content item.

In one embodiment, the system 100 causes, at least in part, the sharing of the at least one content item while the at least one device is sharing the at least one content item via the least one other communication session, for a predetermined duration of time, or a combination thereof. In one embodiment, a source device may share a content item with one or more target devices, wherein the content item may be available only while the source device maintains a communication session with the service provider site where the content is being shared. In one embodiment, the source device may initiate the sharing of the content item, which may be available for a duration of time regardless if the source device maintains a communication session with the service provider sharing site. In one scenario, a first user may share a navigation route with one or more other users/devices so that all users may use the navigation route for traveling to a certain destination. Further, the first user may reach the destination before the other users do, wherein the first user may or may not terminate the communication session with the service provider sharing site; however, the first user may wish to continue sharing of the navigation route for a duration of time so that the navigation route may still be shared with the other users.

In one embodiment, the system 100 causes, at least in part, the sharing of the at least one content item with the one or more other devices while the one or more devices and the at least one device are within close proximity of each other, are at one or more different geo-locations, or a combination thereof. In one embodiment, a source device may initiate sharing of a content item with one or more target devices while the source and the target devices are within close proximity to each other, wherein the sharing may continue when the source and the target devices move to different geo-locations. In one embodiment, a source device may initiate a sharing of a content item with one or more target devices, which may be at different geo-locations. In one scenario, a source device may present to a target device (e.g., via SMS) a request for sharing a content item, wherein the target device may initiate a communication session with a service provider for facilitating the sharing. Further, the service provider may present a token to the target device and/or to the source device so that the source device may initiate sharing of the content item.

In various embodiments, a source device and/or a target device may initiate a request for sharing of a content item.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, and the content providers 107 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the service providers 105 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
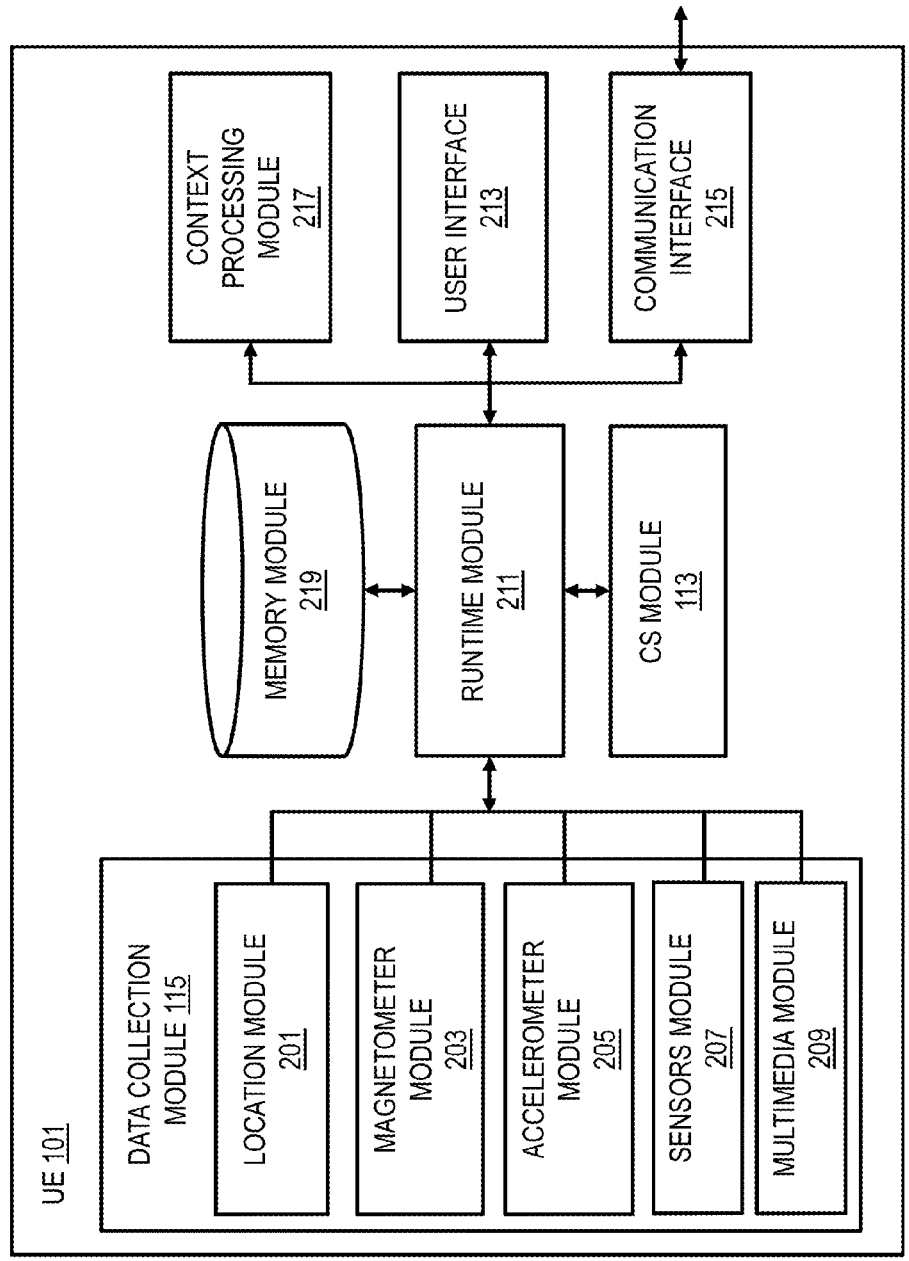
FIG. 2 is a diagram of the components of a user equipment capable of content sharing, according to an embodiment.

FIG. 2 is a diagram of the components of a user equipment capable of content sharing, according to an embodiment. By way of example, a UE 101 includes one or more components for causing communication and sharing of contents from a first device to one or more other devices. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, the CS module 113, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, images, video, audio, and the like, wherein the captured media may be submitted to one or more modules and applications of the UE 101, a service provider, and/or a content provider to further processing, storage, sharing, and the like. In various embodiments, the captured media may be shared with a content sharing module, application, etc. for sharing with one or more other devices. In various embodiments, the multimedia module 209 may interface with various sensors; for example, a camera, a microphone, etc., to capture the media items at a UE 101.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The user interface 213 can include various methods of for a user to interface with applications, modules, sensors, and the like at a UE 101. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the CS module 113, DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

In various embodiments, the runtime module may cause one or more modules/components of a UE 101 to associate one or more available data items with one or more content items available from the one or more modules/components of the UE 101. For example, date, time, location, and user information associated with a device at a particular time may be associated (e.g., as metadata) with an image that is captured by the UE 101 at that particular time.

Figure 3:
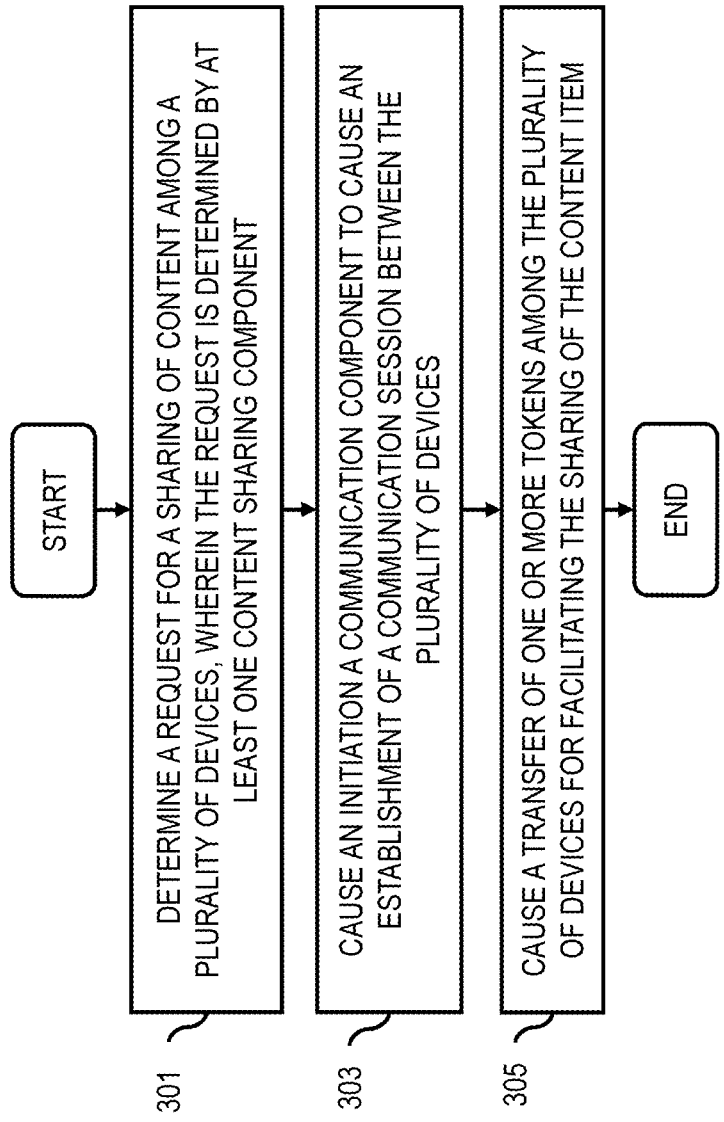
FIGS. 3 and 4 illustrate flowcharts of various processes for, at least, sharing one or more content items, according to various embodiments.
Figure 4:
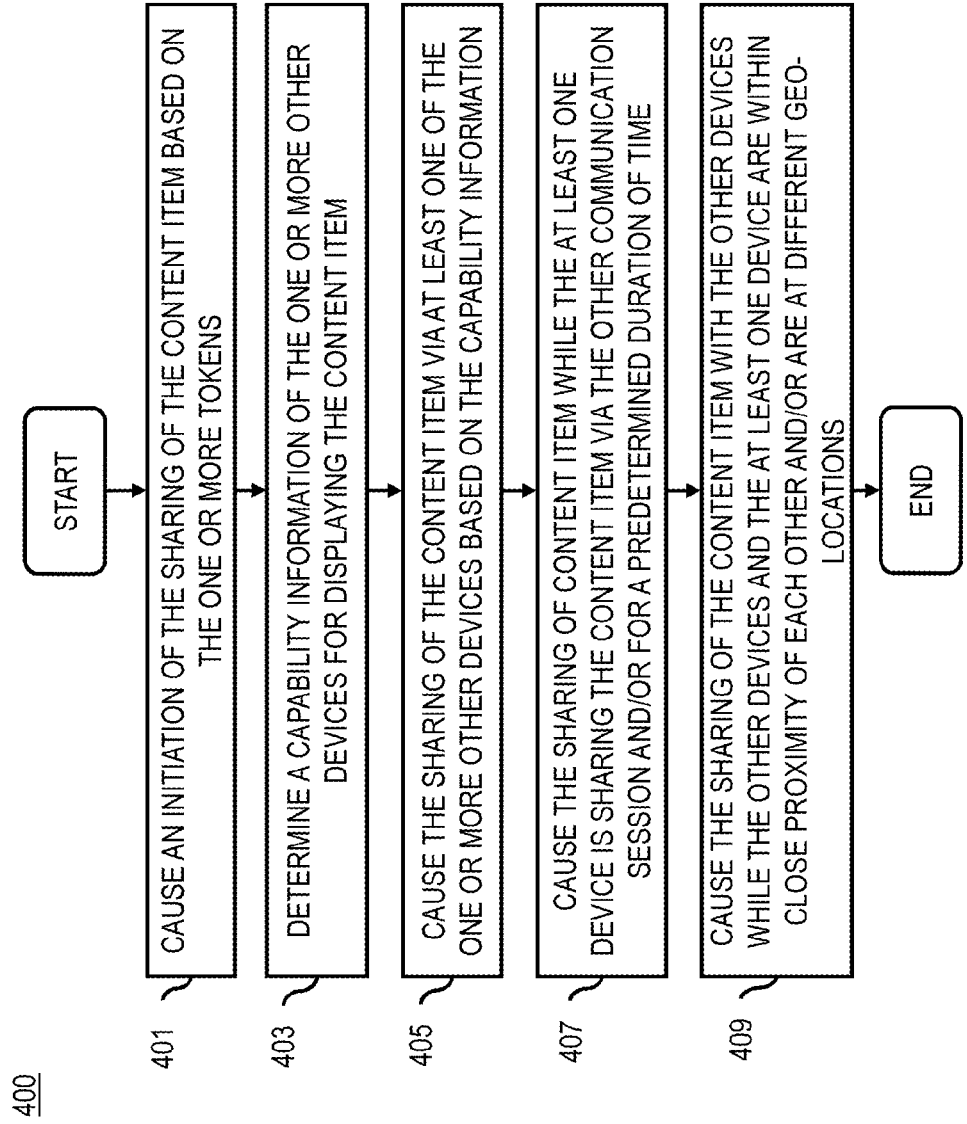
Figure 9:
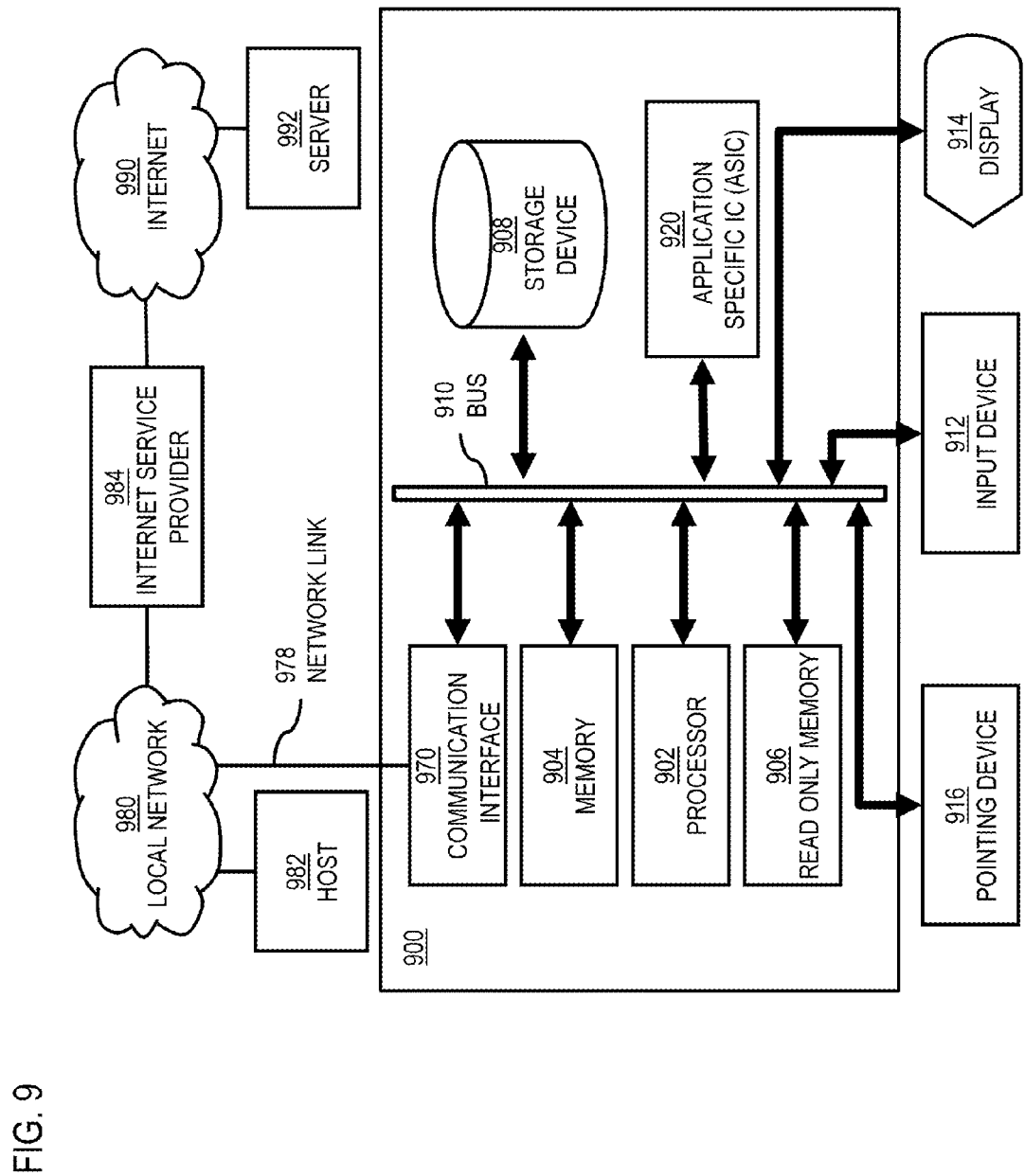
FIG. 9 is a diagram of hardware that can be used to implement an embodiment of the invention.

FIGS. 3 and 4 illustrate flowcharts of various processes for, at least, sharing one or more content items, according to various embodiments. In various embodiments, the CS module 113 may perform processes 300 and 400 that may be implemented, for instance, in a chip set including a processor and a memory as shown in FIG. 9. As such, the CS module 113 can provide means for accomplishing various parts of the process 300 and 400 as well as means for accomplishing other processes in conjunction with other components of the system 100. Throughout this process, the CS module 113 may be referred to as completing various portions of the processes 300 and 400, however, it is understood that other components of the system 100 can perform some of and/or all of the process steps. Further, in various embodiments, the CS module 113 may be implemented in one or more entities of the system 100.

Referring to FIG. 3, the process 300 begins at step 301 where the CS module 113 may determine a request for a sharing of at least one content item between at least one device and one or more other devices, wherein the request is determined by at least one content sharing component. In one embodiment, a user of a first (source) device may select one or more content items for sharing with another (target) device, where the selection and sharing may be effectuated via a content sharing component, module, and/or application. In various embodiments, the source device and the target device may utilize the same or different content sharing components, modules, and/or applications. For example, the source device may utilize a certain content sharing component (e.g., a PhotoBeamer) where the target device may utilize a generic application for consuming a content item, for example, for viewing a digital image on the target device.

In step 303, the CS module 113 may cause, at least in part, an initiation of at least one communication component to cause, at least in part, an establishment of a communication session between the at least one device and the one or more other devices. In one embodiment, the at least one communication session is initiated, at least in part, by the at least one content sharing component at the at least one device, at the one or more other devices, or a combination thereof. In one embodiment, once a content sharing component at a source device detects that a user has selected a content item for sharing, the content sharing component may cause a communication component to establish a communication session with one or more target devices. For example, the content sharing component may cause the content sharing module 113 to cause a communication component to utilize a proximity-based communication protocol to scan for and discover any nearby target devices. In one embodiment, a source device may already have established communication sessions with one or more other devices before a user initiates a content sharing task on the source device. In one embodiment, the communication session between the at least one device and the one or more other devices is based, at least in part, on at least one request from the at least one device using a non-pairing communication protocol. In one embodiment, the source device may establish a proximity-based communication session with a target device via a non-pairing communication protocol, where the target device may not be required to perform a device-pairing process (e.g., passwords, passcodes, etc.) For example, the source device may utilize a communication component to request a communication session with a target device, wherein a communication component on the target device may establish the communication session without a need for a user on the target device to perform any process steps in accepting or completing the process. In one instance, the source device and the target device may utilize a prior communication session information. In one embodiment, the request for a sharing of the at least one content item is initiated, at least in part, by the at least one communication component at the at least one device, at the one or more other devices, or a combination thereof.

In step 305, the CS module 113 may cause, at least in part, a transfer of one or more tokens to the at least one device for facilitating the sharing of the at least one content item, wherein the transfer of the one or more tokens is over the communication session, and wherein the sharing is performed over at least one other communication session. In one embodiment, once a target device receives a request for sharing a content item from another device (e.g., a source device), the target device may establish another communication session (e.g., via a local area network (LAN), a wireless LAN (WLAN), a cellular network channel, etc.) with a service provider via which the content item may be shared, viewed, presented, retrieved, and the like. Further, the service provider may generate/determine one or more tokens associated with a content sharing session/channel/site. In one embodiment, a target device may present the one or more tokens to a source device via the proximity-based communication session. In one embodiment, a service provider may present the one or more tokens to one or more source and/or target devices via one or more communication sessions (e.g., cellular network channel.) Generally, a token may include a unique identifier associated with a service provider site and a current interaction session with a user/device, information related to the user/device, access privileges for other users/devices, authentication credentials, security information, etc., which may be used by one or more user devices to access a service provider site.

Referring to FIG. 4, the process 400 begins at step 401 where the CS module 113 may cause, at least in part, an initiation of the sharing of the at least one content item based, at least in part, on the one or more tokens. In one embodiment, a source device may initiate a sharing of a content item with a target device once the source device receives one or more tokens. In one embodiment, the sharing of the at least one content item with a first one of the one or more devices is performed substantially simultaneously with the sharing of the at least one content item with a second one of the one or more devices. For example, a source device may receive one or more tokens associated with one or more target devices and/or one or more service provider content sharing channels for sharing one or more content items with the one or more target devices. In one embodiment, the each of the one or more tokens is unique to each of the one or more other devices, is shared among the one or more other devices, or a combination thereof. For example, a service provider may present a token associated with a sharing channel/session to a plurality of target devices where, for example, several target devices may access a same content item presented by a source device. In one embodiment, a target device may present/share a token to/with one or more other target devices.

In step 403, the CS module 113 may determine a capability information of the one or more other devices for displaying the at least one content item. In one embodiment, a source device may inquire information on one or more device capability information associated with one or more target devices, via which one or more content items may be shared. For example, the capability information may include information on a display type, memory size, processing power, battery power, user interface features, loud speakers type, and the like. In various embodiments, a target device may present its device capability information directly to a source device, to a service provider, and the like. In one embodiment, the service provider may present a target device capability information to a source device, for example, via a token.

In step 405, the CS module 113 may cause, at least in part, the sharing of the at least one content item via at least one of the one or more other devices based, at least in part, on the capability information. In various embodiments, a source device and/or a service provider may determine to present/share a content item via a target device based on one or more capabilities available at the target device. For example, if there are several target devices which may wish to receive and share a video content item from a source device, the target device with better display and loud speakers may be utilized for sharing the content item.

In step 407 the CS module 113 may cause, at least in part, the sharing of the at least one content item while the at least one device is sharing the at least one content item via the least one other communication session, for a predetermined duration of time, or a combination thereof. In one embodiment, a source device may share a content item with one or more target devices, wherein the content item may be available only while the source device maintains a communication session with the service provider site where the content is being shared. In one embodiment, the source device may initiate the sharing of the content item, which may be available for a duration of time regardless if the source device maintains a communication session with the service provider sharing site. In one scenario, a first user may share a navigation route with one or more other users/devices so that all users may use the navigation route for traveling to a certain destination. Further, the first user may reach the destination before the other users do, wherein the first user may or may not terminate the communication session with the service provider sharing site; however, the first user may wish to continue sharing of the navigation route for a duration of time so that the navigation route may still be shared with the other users.

In step 409, the CS module 113 may cause, at least in part, the sharing of the at least one content item with the one or more other devices while the one or more devices and the at least one device are within close proximity of each other, are at one or more different geo-locations, or a combination thereof. In one embodiment, a source device may initiate sharing of a content item with one or more target devices while the source and the target devices are within close proximity to each other, wherein the sharing may continue when the source and the target devices move to different geo-locations. In one embodiment, a source device may initiate a sharing of a content item with one or more target devices, which may be at different geo-locations. In one scenario, a source device may present to a target device (e.g., via SMS) a request for sharing a content item, wherein the target device may initiate a communication session with a service provider for facilitating the sharing. Further, the service provider may present a token to the target device and/or to the source device so that the source device may initiate sharing of the content item.

Figure 5:
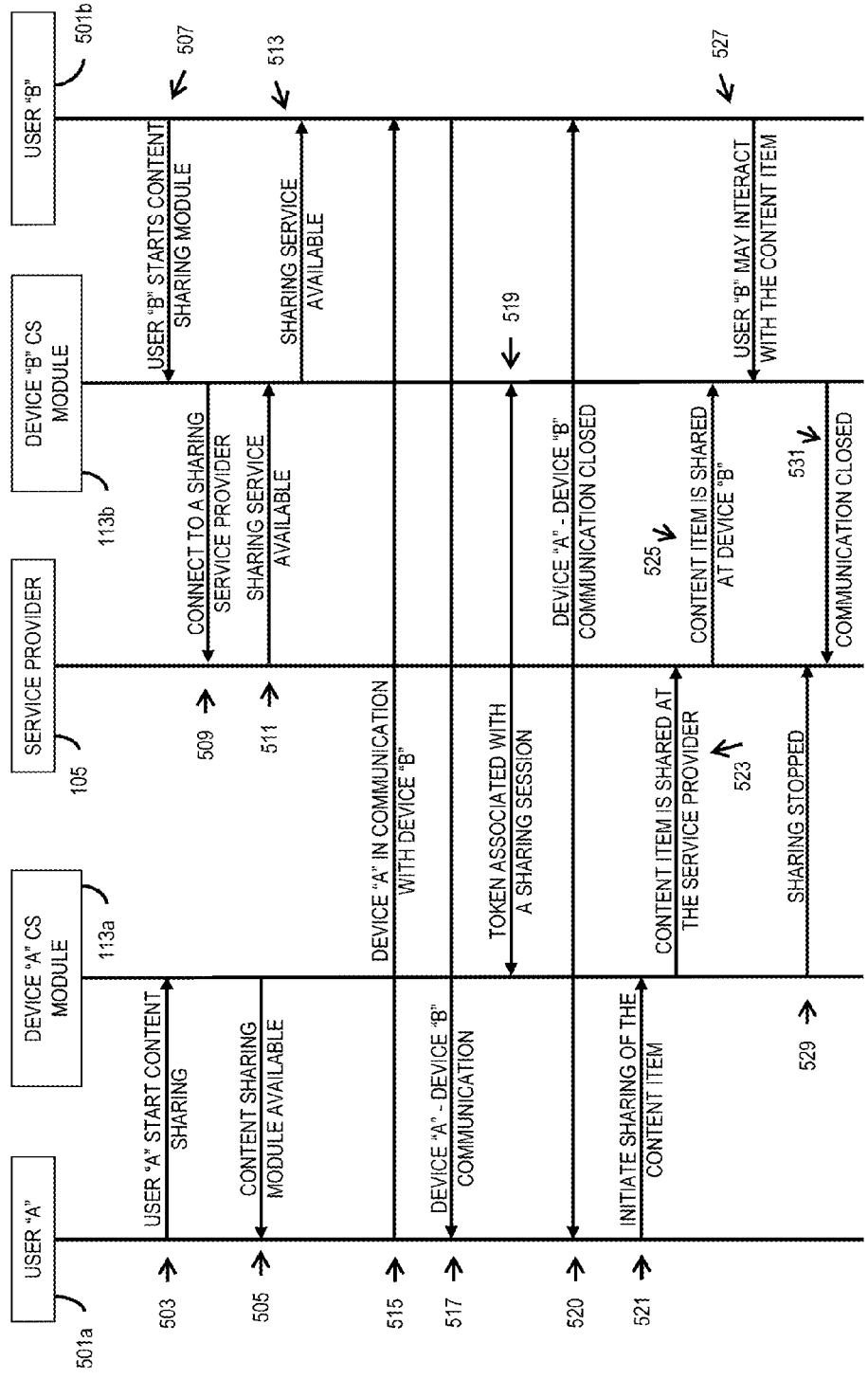
FIG. 5 illustrates an example timing diagram for communication and sharing of content among user devices, according to an embodiments.

FIG. 5 illustrates an example timing diagram for communication and sharing of content among user devices, according to an embodiment.

In FIG. 5, a user "A" 501a and a user "B" 501b wish to share one or more content items via a device "A" (e.g., a mobile phone) and a device "B" (e.g., a tablet.) In one scenario, at 503 the user "A" initiates a CS module 113a at the device "A" and at 505 a UI at the device "A" presents a response back to the user "A" that the CS module 113a is available. At 507, the user "B" may initiate the CS module 113b at the device "B" where at 509 the CS module 113b submits a request for content sharing services to a service provider 105. In one embodiment, the user "B" may directly contact the service provider 105 via one or more other application at the device "B," for example, a web browser application. At 511, the service provider 105 may respond with information, for example a token, associated with one or more sharing services available at the service provider 105. Further, at 515 the user "A" may select one or example target devices for sharing the content with, for example device "B," where the CS module 113a may initiate a communication session via a proximity-based and/or a network-based communication channel with the device "B." Furthermore, at 517, the user of the target device "B" may accept the request from the device "A" and at 519 the CS module 113b may present one or more tokens associated with the service provider 105 sharing channel. In one embodiment, the service provider 105 may directly present the one or more tokens to the CS module 113a. In one embodiment, the CS module at 113a may initiate a sharing session with the device "B," via 519, and transmit and share a temporary token (e.g., a URL hashtag with token) with the device "B" where it may cause a browser on the device "B" to be launched for proceeding with a sharing process. In one embodiment, at 520, the devices "A" and "B" may discontinue one or more direct/indirect active communication channels, for example, a proximity-based communication channel. Moreover, at 521, the user "A" may initiate sharing of the content item via the CS module at 113a where at 523 the content item may be presented at the service provider 105, which at 525 may then be presented at the CS module 113b for interaction by the user "B" at 527. In one embodiment, at 529, the CS module at 113a may stop sharing the content sharing session via the service provider 105 and in one embodiment, at 531; the CS module at 113b may discontinue a communication session with the service provider 105.

FIGS. 6 and 7A through 7D show example UI illustrations utilized for communication and sharing of content among user devices, according to various embodiments.

Figure 6:
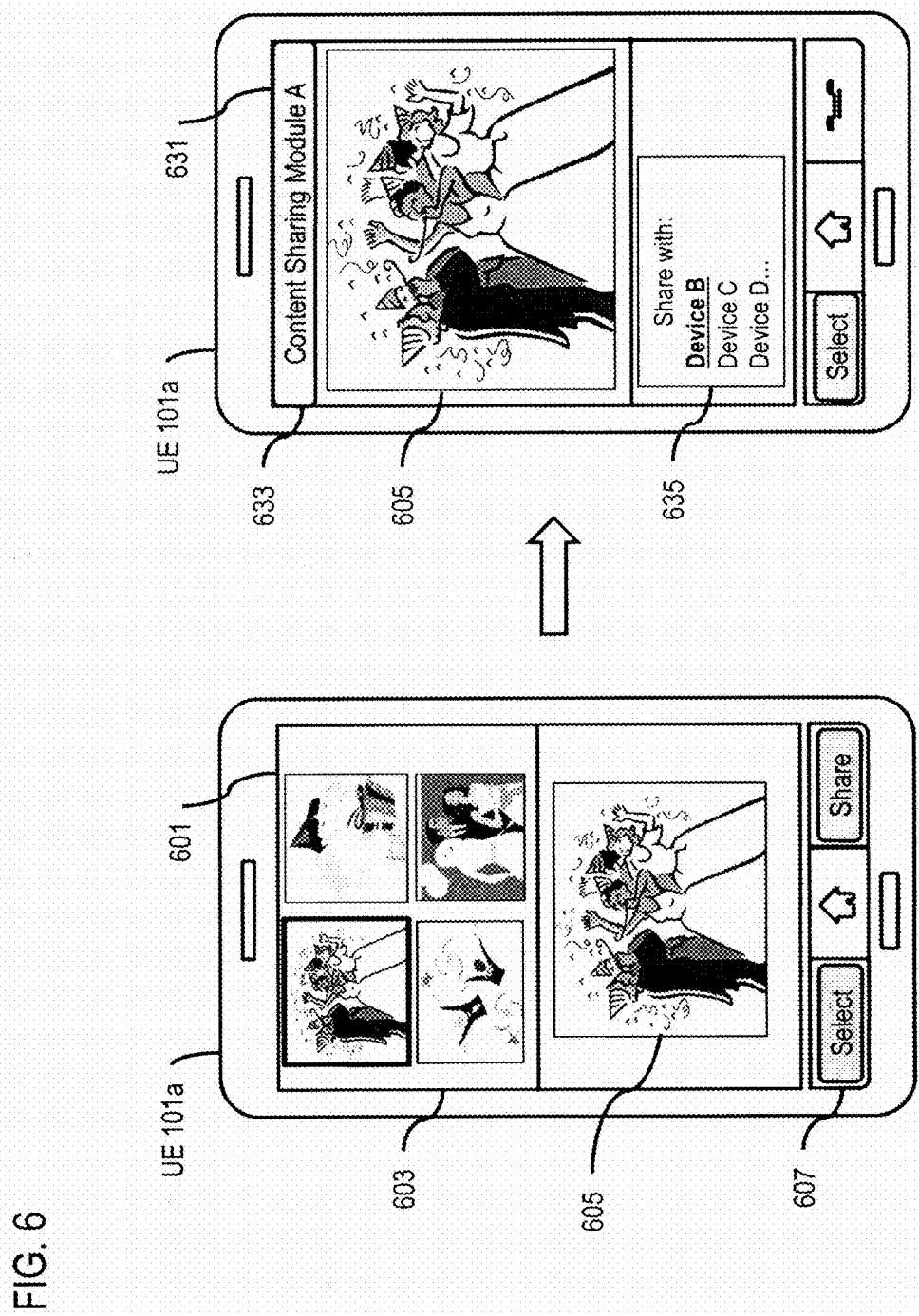

FIG. 6 includes UI 601 on a UE 101a where a user may interact with various content items 603. In one embodiment, a user "A" may select at 607 a content item 605 for sharing with one or more other users/devices. Further, in UI 631 at the UE 101a, the user "A" may utilize a CS module 633 to share the content item 605 with one or more devices from a list 635. In one embodiment, the devices in the list 635 may be discovered via one or more proximity-based communication protocols, a network based protocol, device history, user history, and the like. In one example, the user "A" selects device "B" for sharing the content item 605 with.

Figure 7B:
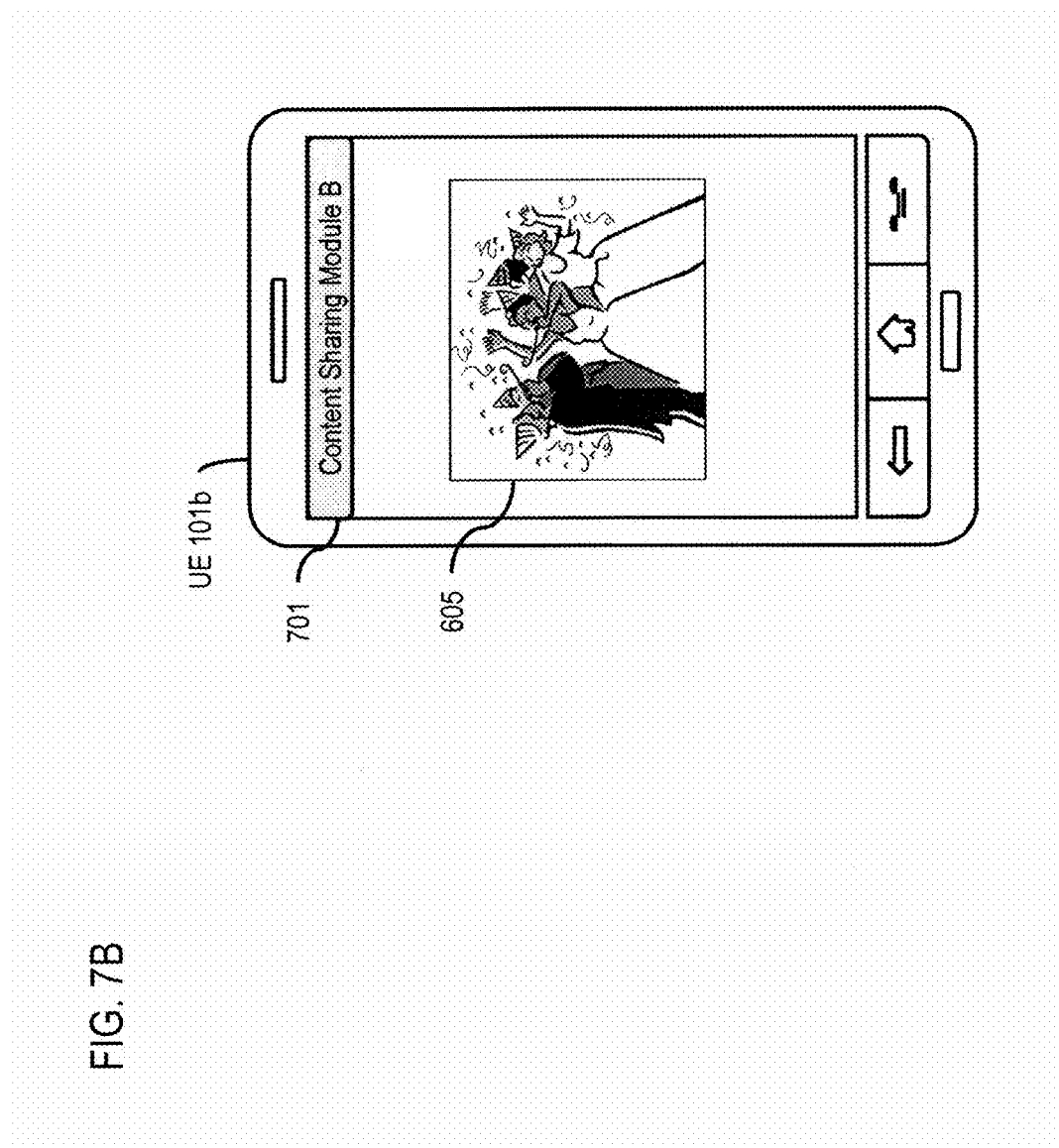

FIG. 7A shows UI 700 at a UE 101b (device "B") which may include a CS module "B" 701. In one scenario, a user "B" may receive a notice 703 indicating that a device "A" is attempting to share a content item with the device "B" where the user "B" may choose to accept the sharing via 607. Further, once the user "B" accepts the sharing, the CS module "B" may cause a communication session with a service provider, for example via indicator 705, for establishing a sharing service whereby the user "A" may share one or more content items with the user "B." In various embodiments, any of the notice indicators, for example, 703 and 705 may be presented while including various UI options. For instance, the indicator 703 and/or 705 may be presented in one or more colors, textures, or other with graphical effects, which a user may tap, click, highlight, or the like to accept, reject, and/or cause one or more actions. In various embodiments, one or more UI notification indicators (e.g., 703, 705, etc.) may be utilized in place of or in concert with one or more other UI options (e.g., 607), keys, virtual keys, or the like. Furthermore, in the UI 631 of the UE 101a, the CS module 633 may receive one or more tokens 707 from the UE 101b and/or from a service provider associated with the content sharing service, wherein the tokens may include a unique identifier associated with the service provider site and a current interaction session with a user/device, information related to the user/device, access privileges for other users, authentication credentials, security information, etc., which may be used by one or more user devices to access a service provider site. Moreover, the user "A" may select to initiate the sharing of the content item 605, where in FIG. 7B, the user "B" of the UE 101*b* may view and interact with the content item.

Figure 7C:
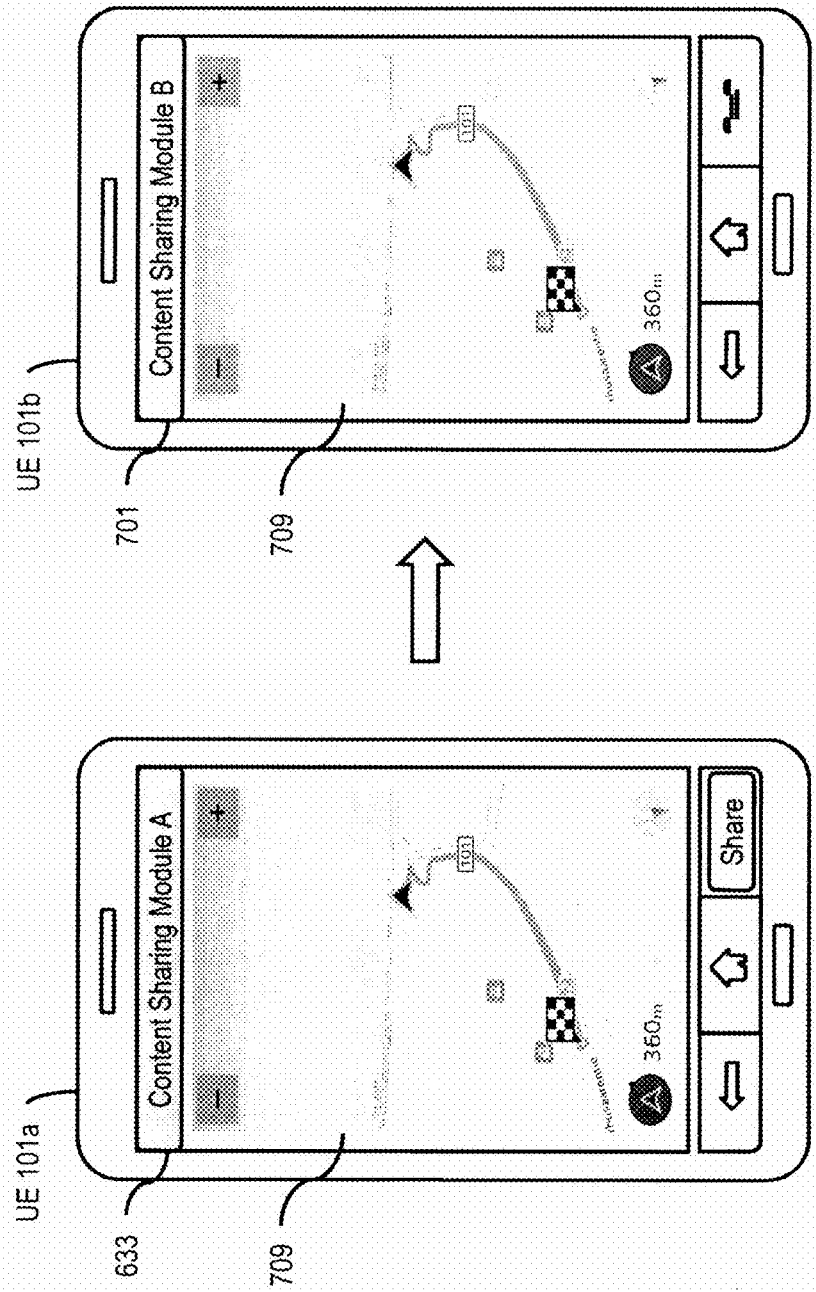

In FIG. 7C, in one embodiment, a user "A" may utilize a UE 101*a* to determine a navigation route 709 (e.g., via a navigation service) on a map application at the UE 101*a*, where the user "A" may share the navigation route 709 and associated guidance with one or more users, for example, a user "B" at a UE 101*b*. In various embodiments, the navigation route and associated guidance may be processed at the UE 101*a* and then a map view with the associated guidance may be shared as an image where a recipient user (e.g., a user "B") may interact with the image, for instance, zoom in/out to view the map image at different granularities. In one embodiment of FIG. 7D, a UE 101*a* may determine a plurality of screen-shots and share the screen-shots in a certain order, for example 711 and 713, (e.g., in logical, consecutive, by point-of-interests, etc. order) so that other users may receive/view the screen-shots for following the navigation route. In one embodiment, the system 100 may determine location information (e.g., via GPS, cellular tower triangulation, etc.) of a particular user (e.g., user "B") for presenting a sequence of images according to the particular user's location. In one embodiment, a navigation/map application may track the users' movements for generating a map view from a plurality of images (e.g., screen shots, different map images, etc.) of the map which may include a navigation route utilized by a user sharing the navigation route.

Figure 8:
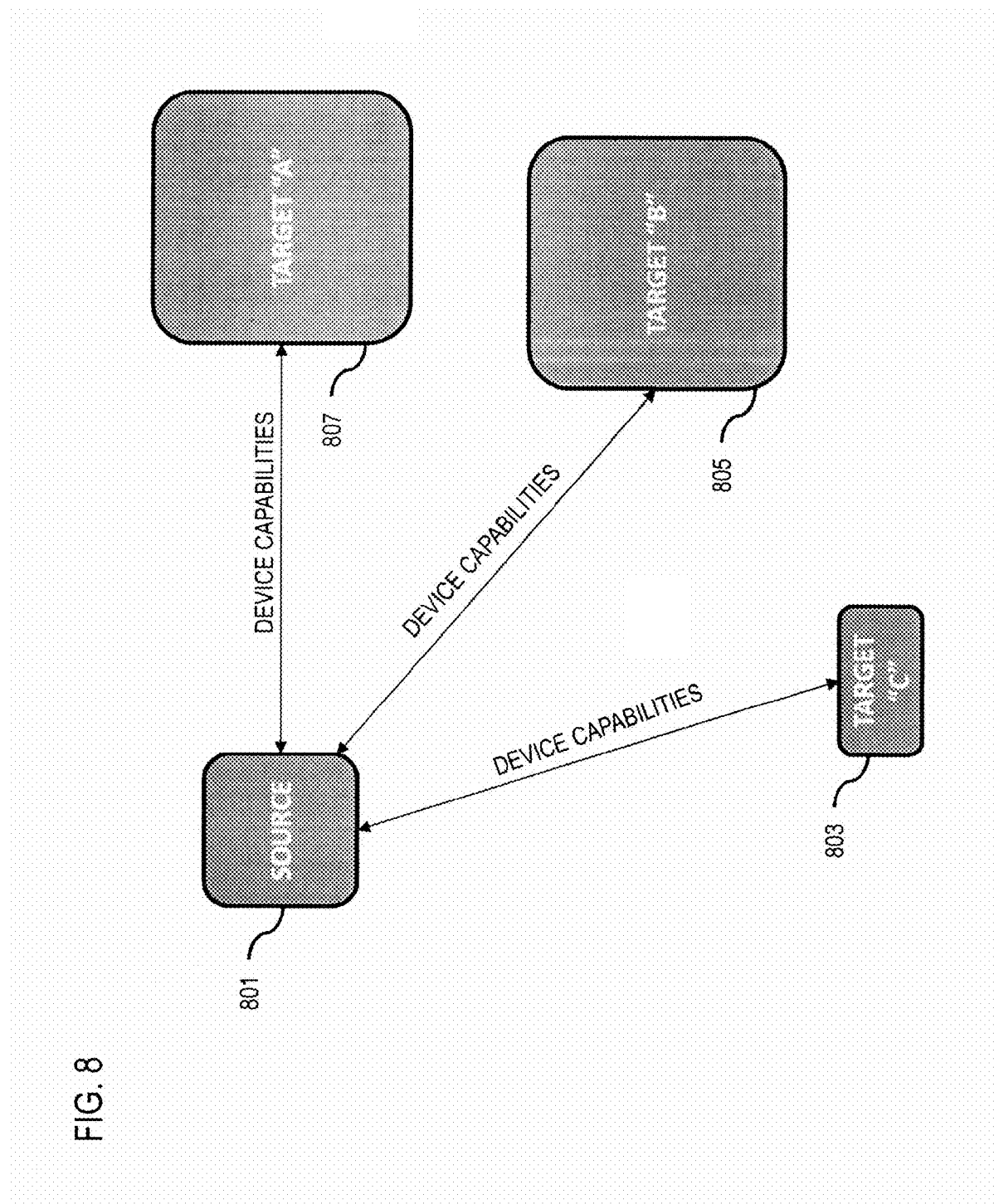
FIG. 8 illustrates various device and associated capability information, according to an embodiment.

FIG. 8 illustrates various device and associated capability information, according to an embodiment. In one embodiment, a source device 801 may inquire device capabilities of the target devices 803, 805, and 807 where one or more content items may be shared via the target devices. In various embodiments, capability information may include information on a display type, a display size, processing power, power level, loud speakers, and the like associated with each of the target devices. In one embodiment, the source device may determine which target device may be best for presenting/sharing the one or more content items. In one embodiment, a user of a device with less capabilities, for example 803, may be directed to share/view the shared content items via another nearby device (e.g., 801, 805, etc.)

The processes described herein for communication and sharing of content among user devices may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) for communication and sharing of content among user devices to as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps for communication and sharing of content among user devices.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to a more efficient and user friendly mechanism for sharing content among users. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for communication and sharing of content among user devices. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for communication and sharing of content among user devices, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914, and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 111 for communication and sharing of content among user devices.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980, and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
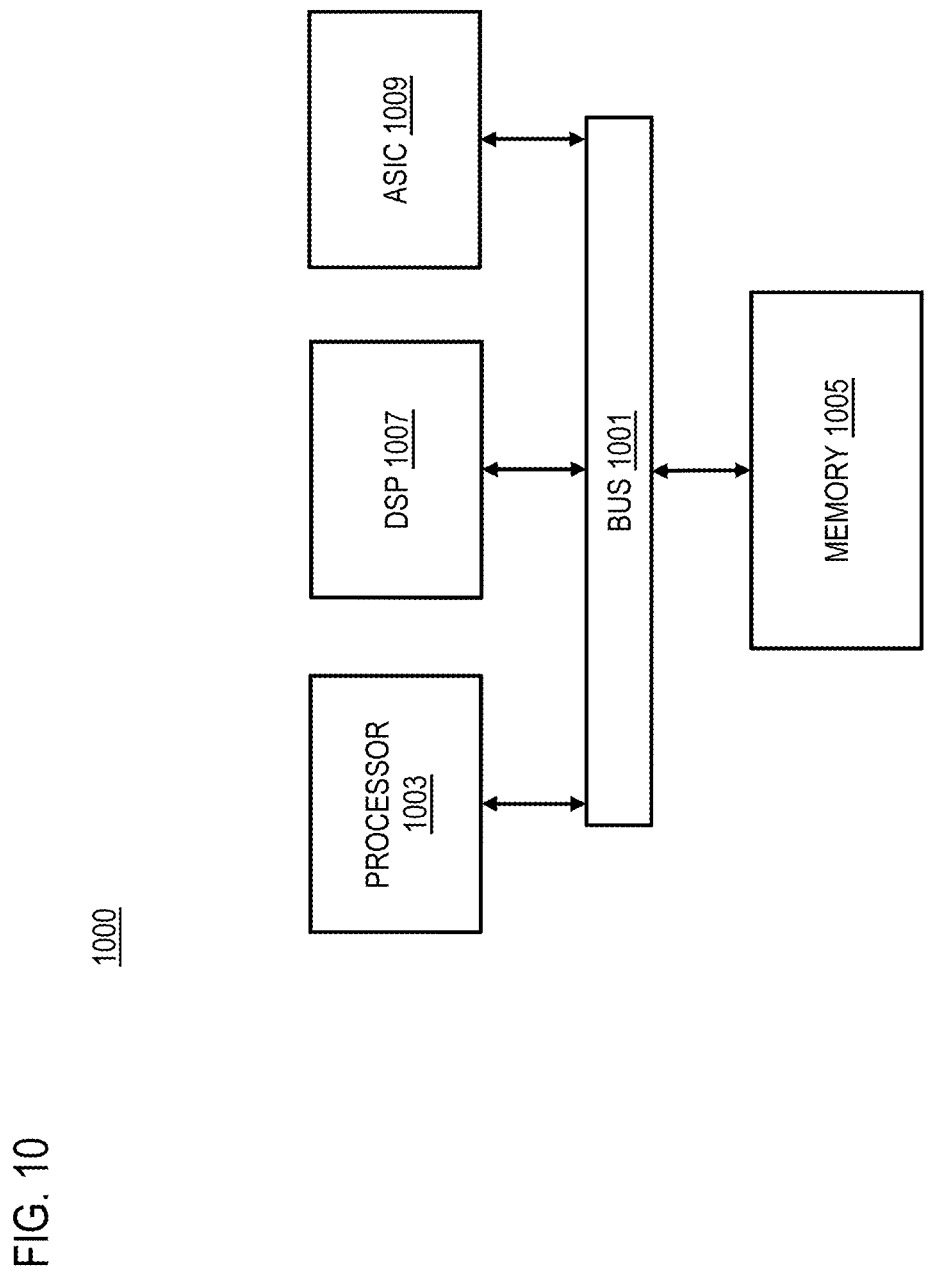
FIG. 10 is a diagram of a chip set that can be used to implement an embodiment of the invention.

FIG. 10 illustrates a chip set or chip 1000 upon which an embodiment of the invention may be implemented. Chip set 1000 is programmed for communication and sharing of content among user devices as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps for communication and sharing of content among user devices.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for communication and sharing of content among user devices. The memory 1005 also stores the data associated with or generated by the execution of the inventive steps.

Figure 11:
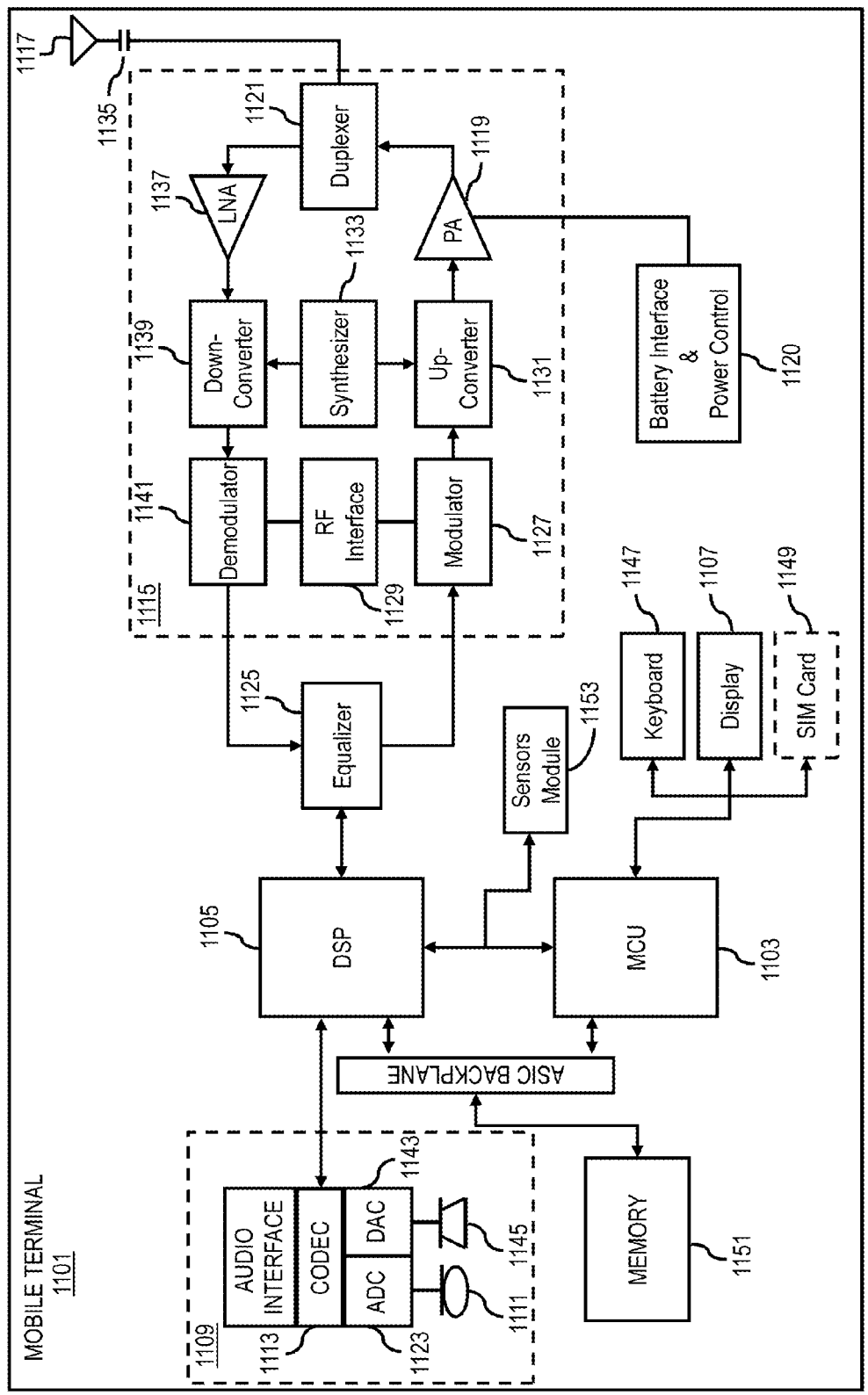
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps for communication and sharing of content among user devices. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps for communication and sharing of content among user devices. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for communication and sharing of content among user devices. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a request for a sharing of at least one content item between at least one device and one or more other devices via a service provider site that receives the at least one content item from the at least one device, wherein the request is determined by at least one content sharing component;
    initiating at least one communication component to cause an establishment of a communication session between the at least one device and the one or more other devices; and
    transferring, over the communication session, one or more tokens received by the one or more other devices from the service provider site to the at least one device for facilitating the sharing of the at least one content item, the one or more tokens each comprising a unique identifier that identifies the service provider site,
    wherein the at least one device initiates sharing of the at least one content item after receipt of the one or more tokens from the one or more other devices,
    wherein the sharing is performed over other communication sessions via the service provider site, and
    wherein the sharing continues for a predetermined duration of time even after the at least one device terminates a connection between the at least one device and the service provider site.

2. The method of claim 1, further comprising:
    initiating the sharing of the at least one content item based, at least in part, on the one or more tokens by establishing a connection between the at least one device and the service provider site using the one or more tokens over the other communication sessions and by establishing another connection between the one or other devices and the service provider site using the one or more tokens over another one of the other communication sessions.

3. The method of claim 2, wherein the sharing of the at least one content item with a first one of the one or more devices is performed simultaneously with the sharing of the at least one content item with a second one of the one or more devices.

4. The method of claim 1, wherein the communication session between the at least one device and the one or more other devices is based on at least one request from the at least one device using a non-pairing communication protocol.

5. The method of claim 1, wherein each of the one or more tokens is unique to each of the one or more other devices, is shared among the one or more other devices, or a combination thereof.

6. The method of claim 1, further comprising:
    determining a capability information of the one or more other devices for displaying the at least one content item; and
    causing the sharing of the at least one content item via at least one of the one or more other devices based, at least in part, on the capability information.

7. The method of claim 1, wherein the at least one communication session is initiated by the at least one content sharing component at the at least one device, at the one or more other devices, or a combination thereof.

8. The method of claim 1, wherein the request for a sharing of the at least one content item is initiated by the at least one communication component at the at least one device, at the one or more other devices, or a combination thereof.

9. The method of claim 1, further comprising:
    initiating the sharing of the at least one content item with the one or more other devices while the one or more devices and the at least one device are within close proximity of each other, are at one or more different geo-locations, or a combination thereof.

10. An apparatus comprising:
    at least one processor; and
    at least one memory including computer program code for one or more programs,
        the at least one memory and the computer program code configured to, with the at least one processor, cause the apparatus to perform at least the following,
        determine a request for a sharing of at least one content item between at least one device and one or more other devices via a service provider site that receives the at least one content item from the at least one device, wherein the request is determined by at least one content sharing component;
        initiate at least one communication component to cause an establishment of a communication session between the at least one device and the one or more other devices; and
        transfer, over the communication session, one or more tokens received by the one or more other devices from the service provider site to the at least one device for facilitating the sharing of the at least one content item, the one or more tokens each comprising a unique identifier that identifies the service provider site,
        wherein the at least one device initiates sharing of the at least one content item after receipt of the one or more tokens from the one or more other devices,
        wherein the sharing is performed over other communication sessions via the service provider site, and
        wherein the sharing continues for a predetermined duration of time even after the at least one device terminates a connection between the at least one device and the service provider site.

11. The apparatus of claim 10, wherein the apparatus is further caused to:

initiate the sharing of the at least one content item based, at least in part, on the one or more tokens by establishing a connection between the at least one device and the service provider site using the one or more tokens over the other communication sessions and by establishing another connection between the one or other devices and the service provider site using the one or more tokens over another one of the other communication sessions.

12. The apparatus of claim 11, wherein the sharing of the at least one content item with a first one of the one or more devices is performed simultaneously with the sharing of the at least one content item with a second one of the one or more devices.

13. The apparatus of claim 10, wherein the communication session between the at least one device and the one or more other devices is based on at least one request from the at least one device using a non-pairing communication protocol.

14. The apparatus of claim 10, wherein each of the one or more tokens is unique to each of the one or more other devices, is shared among the one or more other devices, or a combination thereof.

15. The apparatus of claim 10, wherein the apparatus is further caused to:

determine a capability information of the one or more other devices for displaying the at least one content item; and cause the sharing of the at least one content item via at least one of the one or more other devices based, at least in part, on the capability information.

16. The apparatus of claim 10, wherein the at least one communication session is initiated by the at least one content sharing component at the at least one device, at the one or more other devices, or a combination thereof.

17. The apparatus of claim 10, wherein the request for a sharing of the at least one content item is initiated by the at least one communication component at the at least one device, at the one or more other devices, or a combination thereof.

18. The apparatus of claim 10, wherein the apparatus is further caused to:

cause the sharing of the at least one content item with the one or more other devices while the one or more devices and the at least one device are within close proximity of each other, are at one or more different geo-locations, or a combination thereof.

* * * * *